United States Patent
Replogle (10) Patent No.: US 8,320,126 B2
(45) Date of Patent: Nov. 27, 2012

(54) SHELF UNIT FOR USE IN A COMMUNICATION NETWORK

(75) Inventor: Kriss K. Replogle, Brookside, NJ (US)

(73) Assignee: Fujitsu Limited, Kawasaki-shi (JP)

( * ) Notice: Subject to any disclaimer, the term of this patent is extended or adjusted under 35 U.S.C. 154(b) by 290 days.

(21) Appl. No.: 12/848,624

(22) Filed: Aug. 2, 2010

(65) Prior Publication Data
US 2012/0024803 A1 Feb. 2, 2012

(51) Int. Cl.
  *H05K 7/20* (2006.01)
  *H05K 5/00* (2006.01)
  *H05K 7/00* (2006.01)
(52) U.S. Cl. ............. 361/695; 361/679.01; 361/679.02; 361/690; 361/692; 361/729
(58) Field of Classification Search .................. None
See application file for complete search history.

(56) References Cited

U.S. PATENT DOCUMENTS

| | | | |
|---|---|---|---|
| 4,334,261 A * | 6/1982 | Gonzales | 361/679.4 |
| 6,625,020 B1 * | 9/2003 | Hanson et al. | 361/695 |
| 6,700,779 B2 * | 3/2004 | Hanson et al. | 361/695 |
| 6,707,686 B2 * | 3/2004 | Fritz et al. | 361/796 |
| 6,912,129 B2 * | 6/2005 | Baker et al. | 361/695 |
| 6,937,461 B1 * | 8/2005 | Donahue, IV | 361/622 |
| 6,940,730 B1 * | 9/2005 | Berg et al. | 361/796 |
| 7,236,362 B2 * | 6/2007 | Wang et al. | 361/695 |
| 7,440,262 B2 * | 10/2008 | Coffey et al. | 361/627 |
| 7,692,924 B2 * | 4/2010 | Wavering et al. | 361/699 |
| 2007/0242420 A1 * | 10/2007 | Hoshino et al. | 361/600 |

* cited by examiner

*Primary Examiner* — Boris Chervinsky
(74) *Attorney, Agent, or Firm* — Baker Botts L.L.P.

(57) ABSTRACT

A kit for providing front-access cable terminations for rear-access shelf unit mounted in a rack system may comprise a terminal block panel, a terminal block, a set of extension cables, a rear panel, and a baffle. The terminal block panel may be configured to mount to the shelf unit. The terminal block may be mounted to the terminal block panel to provide front-access terminations for the shelf unit. The set of extension cables may provide electrical connection between the terminal block and one or more terminals disposed on a back plane associated with the shelf unit. The rear panel may be configured to attach to the shelf unit and to cover the set of extension cables. The baffle may be configured for installation in the rack system above the shelf unit and removable for access to the front-access terminations. The baffle may be configured to direct air flow rising from the rear-access equipment to the rear of the rack.

21 Claims, 8 Drawing Sheets

SHELF UNIT FOR USE IN A COMMUNICATION NETWORK

TECHNICAL FIELD OF THE INVENTION

The present invention relates generally to rack system equipment for use with a communication network, and more particularly to equipment and methods for designing and building rear-access and front-access shelf units from common parts and assembly methods.

BACKGROUND

Telecommunications systems, cable television systems, and data communication networks use optical networks to rapidly convey large amounts of information between remote points. These networks may include a system of multiple network components, including switches, routers, converters, modulators, demodulators, etc.

One or more network components may be housed in a server chassis which may, in turn, be mounted in a rack system. A network component may include any equipment designed to be mounted in a rack and may be described as "rack-mount", "rack mounted", "rack mount chassis", or "shelf". In many cases, the server chassis provides electrical connections for the various components, physical connections between components and/or the rack system, and input/output access for cables, wiring, etc. In general, a server chassis may be called "rear-access" if cable and/or wiring connections are made from the rear of the server chassis and "front-access" if the cable and/or wiring connections are made from the front of the server chassis.

SUMMARY

In accordance with a particular embodiment of the present invention, a kit for providing front-access cable terminations for rear-access shelf unit mounted in a rack system may comprise a terminal block panel, a terminal block, a set of extension cables, a rear panel, and a baffle. The terminal block panel may be configured to mount to the shelf unit. The terminal block may be mounted to the terminal block panel to provide front-access terminations for the shelf unit. The set of extension cables may provide electrical connection between the terminal block and one or more terminals disposed on a back plane associated with the shelf unit. The rear panel may be configured to attach to the shelf unit and to cover the set of extension cables. The baffle may be configured for installation in the rack system above the shelf unit and removable for access to the front-access terminations. The baffle may be configured to direct air flow rising from the rear-access equipment to the rear of the rack.

In accordance with another particular embodiment of the present invention, a shelf unit for use in a rack system may include a chassis, a backplane, a first terminal block, a second terminal block, a set of extension cables, a rear panel, a fan tray, and a baffle. The chassis may be configured for mounting in the rack system. The backplane may include a plurality of connectors for various plug-in units. A first terminal block may be disposed at the rear of the chassis. The first terminal block may be in electronic communication with the plurality of connectors. The second terminal block may be disposed at the top of the chassis. The second terminal block may provide front-access terminations at the top of the chassis. The set of extension cables providing electrical connection between the first terminal block and the second terminal block. The rear panel may be attached to the rear of the chassis and covering the set of extension cables. The fan tray may be disposed adjacent the bottom of the chassis and configured to draw air from the bottom of the chassis upward across the various plug-in units. The baffle may be disposed adjacent the top of the chassis and disposed to direct air exiting the top of the chassis to the rear of the chassis.

In accordance with another particular embodiment of the present invention, a user may employ a method for converting a rear-access shelf unit for use with a rack system into a front-access shelf unit. The method may include mounting a terminal block panel at the top of the shelf unit disposed adjacent the rear of the shelf unit. The method may include mounting a terminal block on the terminal block panel. The method may include connecting a first end of an extension cable to a rear-access terminal block disposed on the rear of the shelf unit. The method may include connecting a second end of the extension cable to the terminal block mounted on the terminal block panel. The method may include covering the extension cable with a rear panel.

The teachings of the present disclosure may provide a variety of benefits in comparison to known alternatives. For example, the teachings of the present disclosure may allow a rear-access shelf unit and a front-access shelf unit to be designed and built from common parts and assembly methods. Common parts and assembly methods may reduce fabrication and/or design cost in comparison to stand-alone shelf units. As another example, the teachings of the present disclosure may provide shelf units that require less rack space while maintaining similar air flow space when compared to traditional front-access shelf units. Reduced rack space requirements may allow for either reduced floor space requirements and/or an increased number of shelf units disposed in a given bay and/or rack.

In general, using a front-access shelf model converted to rear-access increases the rack space requirement over rear-access shelf models. Many traditional front-access designs fail to effectively isolate the heat exhausted from a first shelf unit to a second shelf unit mounted directly above the first. The options for exhaust isolation may be limited because a user must have sufficient space to access the front-access cable terminals. In contrast, the teachings of the present disclosure may allow a user to convert a rear-access shelf unit for front-access use without increasing the rack space requirements and without compromising the exhaust isolation between shelf units. It will be understood that the various embodiments of the present invention may include some, all, or none of the enumerated technical advantages. In addition, other technical advantages of the present invention may be readily apparent to one skilled in the art from the figures, description and claims included herein.

DETAILED DESCRIPTION

Preferred embodiments and their advantages are best understood by reference to FIGS. 1 through 5, wherein like numbers are used to indicate like and corresponding parts. Modular communication systems may employ rack systems to mount a variety of electronic components.

Figure 1:
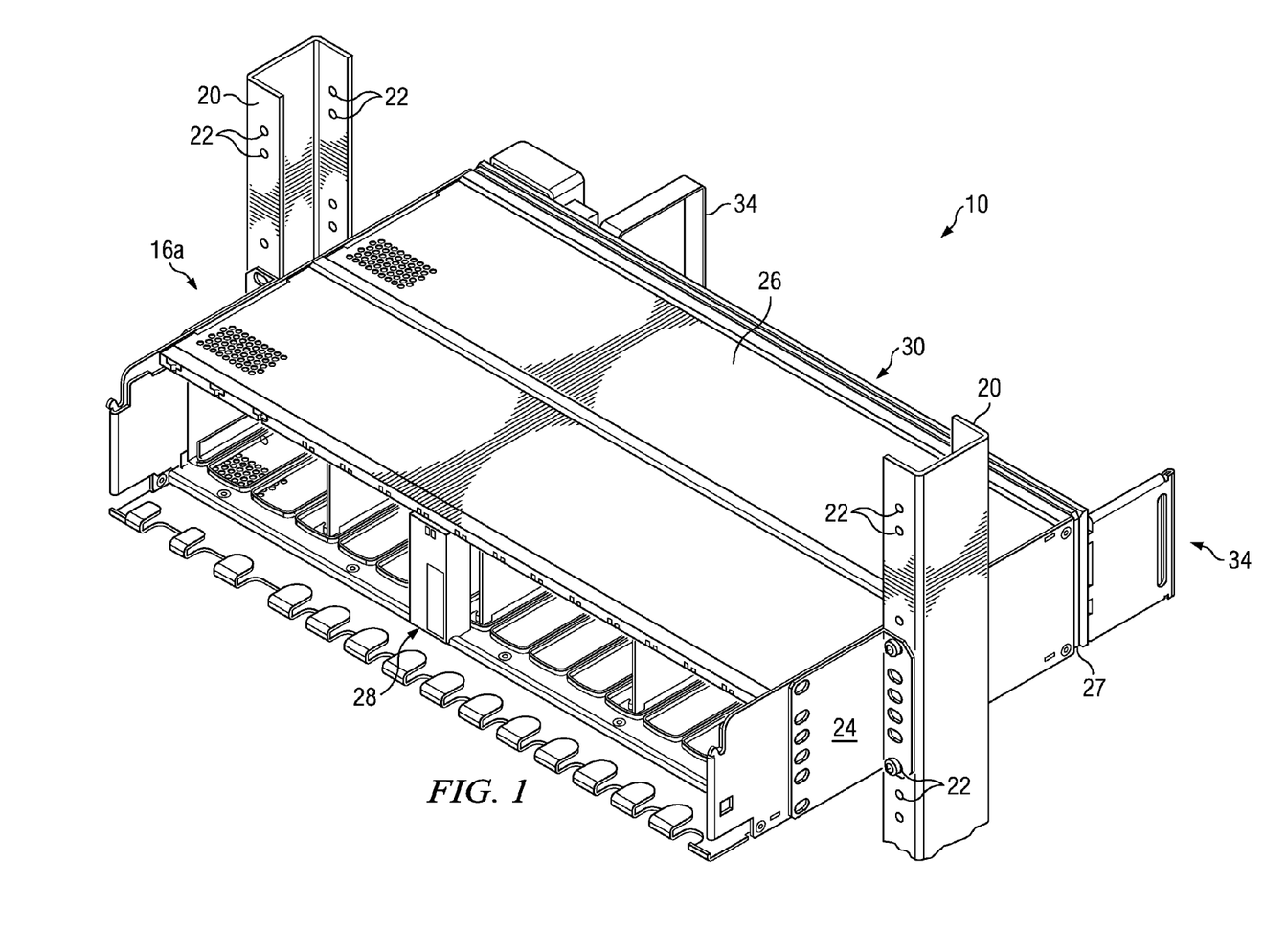
FIG. 1 illustrates example components of a communication system including an example shelf unit incorporating teachings of the present disclosure.

FIG. 1 illustrates example components of a communication system 1 including a rack system 10 for mounting various components of the communication system and at least one shelf unit 16 (e.g., 16a as shown in FIG. 1).

Rack system 10 may include two or more upright posts 20. Upright posts 20 may include any device, component, and/or feature of rack system 10 configured to define one or more bays between two adjacent upright posts 20. In the embodiment shown in FIG. 1, upright posts 20 define a single bay. Upright posts 20 may include holes 22 defining one or more sets of mounting points for various components (e.g., shelf unit 16a) of the communication system. Holes 22 may be configured to allow attachment by bolts and/or other connectors.

Electronic components of the communication system may comprise any suitable hardware and/or software operable to provide functionality for the communications system, including any memory, processor, or other components. Electronic components may provide networking applications, such as telecommunications or data routing. Electronic components may comprise physical interfaces on the front side, the back side, or both to connect to other network components and send signals to and receive signals from such other network components. Various components of rack system 10 may provide a variety of functions, such as providing electrical connectivity between components of communication system 1 and transmitting signals between these components.

Some rack systems include at least one shelf unit 16 configured to receive and connect a variety of plug-in units (PIUs) 28. Shelf unit 16a as shown may include chassis 26 housing a backplane 27 providing electrical connections to PIU 28 and mechanical features providing physical mounting and/or retaining force for the PIU 28. In addition, shelf unit 16 may include mounting brackets 24 configured to provide a connection to upright posts 20.

Chassis 26 may include a structural frame and/or other components configured to mount securely to upright posts 20 and provide connections for various plug-in units 28. The connections may include electrical and/or power connections associated with backplane 27 and/or physical attachments points associated with chassis 26 and/or backplane 27. In some embodiments, chassis 26 may be formed of folded sheet metal, riveted sheet metal, and/or any other appropriate material.

Backplane 27 may include a circuit board (e.g., a printed circuit board (PCB)) and one more connectors disposed on the circuit board. Backplane 27 may provide a variety of connectors configured to allow a user to connect multiple PIUs 28 and/or additional PCBs providing additional and/or alternative functionality to communication system 1. In some embodiments, backplane 27 may not include independent processing components.

Chassis 26 may include associated rear cover 30. When mounted to chassis 26, rear cover 30 may be disposed adjacent the backplane of shelf unit 16. Rear cover 30 may protect the backplane from unauthorized access and/or contamination. Rear cover 30 may provide electrical grounding for safety compliance and/or to reduce the risk of electrostatic discharge (ESD), electromagnetic interference (EMI), and/or electrical fast transients (EFT). In some embodiments, rear cover 30 may provide structural support for various cables associated with the communication system and/or the electronic components mounted in shelf unit 16 (e.g., cable ties 34).

Cable brackets 34 may provide structural features appropriate for attaching one or more cables. Cables may be used to provide electronic and/or power communication to various components associated with shelf 26 (e.g., I/O panels 50). Cable brackets 34 may be connected to panel 32 by snap fit and/or with separate connectors.

Figure 2A:
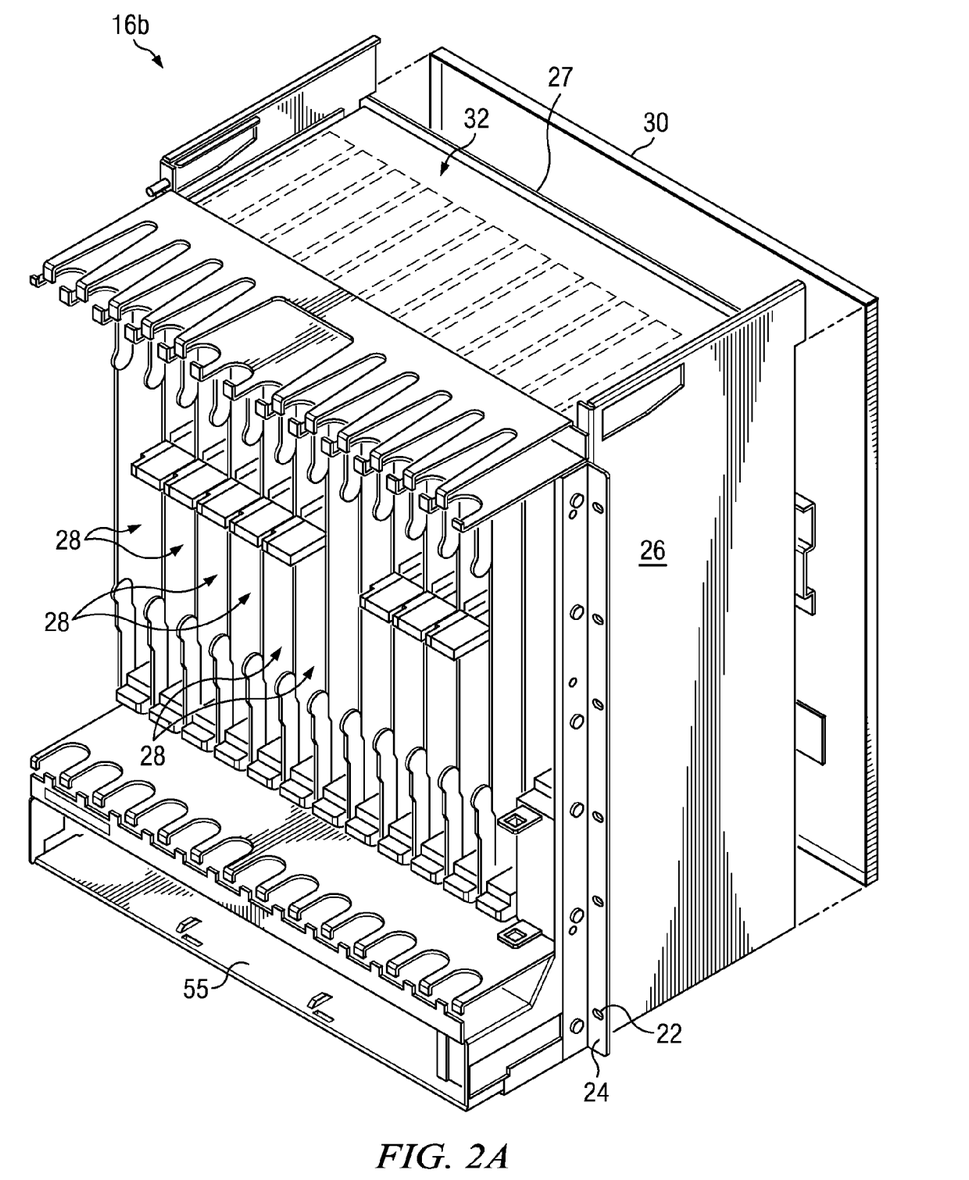
FIGS. 2A and 2B illustrate an example rear-access shelf unit for mounting electronics components housed in a rack system, in accordance with the teachings of the present disclosure.
Figure 2B:
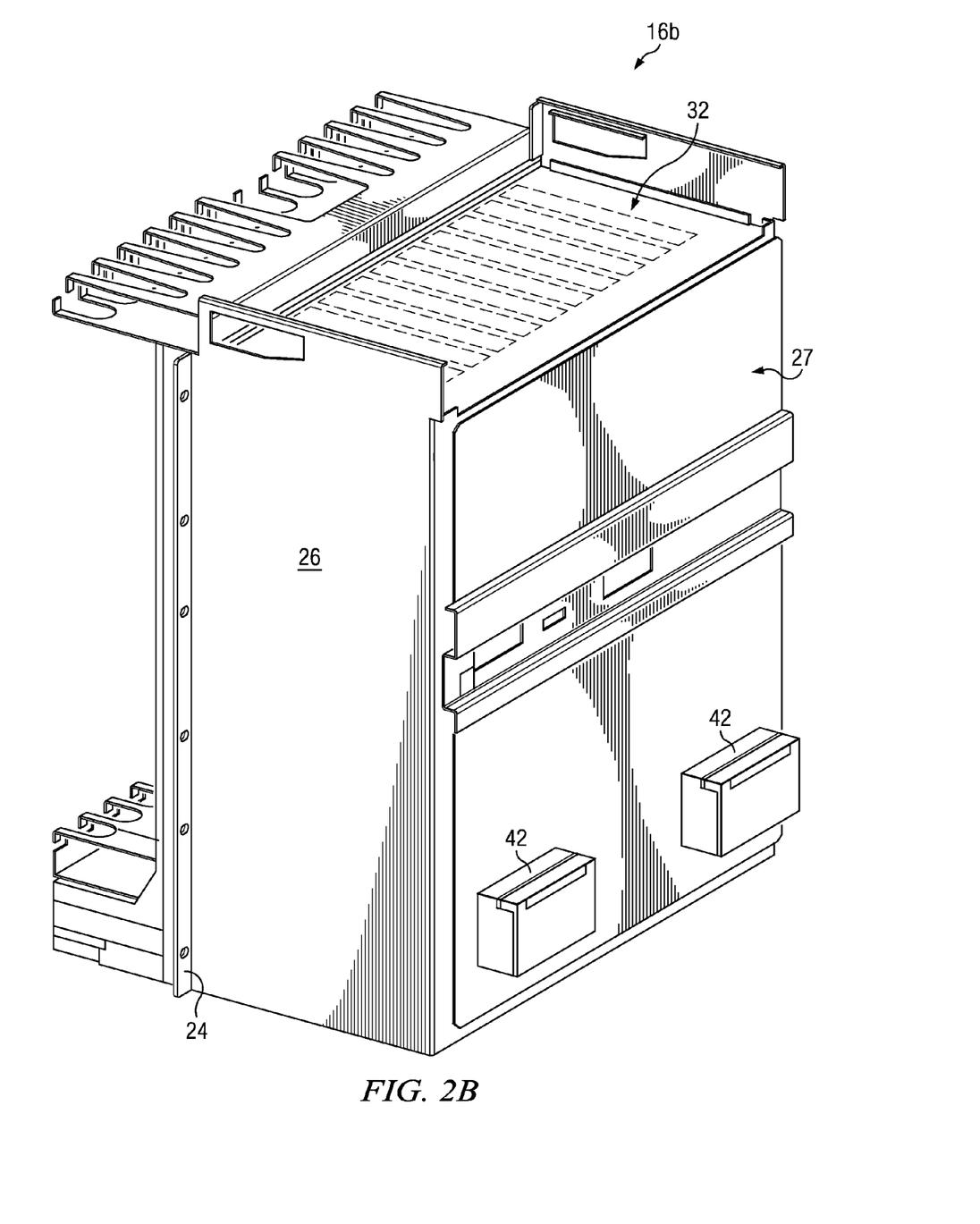

FIGS. 2A and 2B illustrate another embodiment of a shelf unit 16b that may be used with teachings of the present disclosure. Shelf unit 16b may include mounting brackets 24, chassis 26, backplane 27, rear cover 30, and exhaust panel 32. Mounting brackets 24 may include any device, components, and/or feature of shelf unit 16b configured to connect chassis 26 to upright posts 20. As shown in FIGS. 2A and 2B, mounting brackets 24 may include angle iron, channel, and/or brackets.

Shelf unit 16b may include one or more terminal blocks 42 disposed on the rear of chassis 26 adjacent backplane 27. In some embodiments, terminal blocks 42 may be mounted on and/or part of backplane 27. A shelf unit with terminal blocks 42 mounted on the rear of chassis 26 may be called "rear-access." FIG. 2B shows shelf unit 16b without rear cover 30 for clarity.

Terminal blocks 42 may include a plurality of terminals available for a user to attach a variety of wire and/or conductors. For example, terminal blocks 42 may include screw terminals for bare wires, barrier strips with or without set screws, and/or screw terminals with attached spade and/or loop lugs. Terminal blocks 42 may provide connections to ground circuits, power circuits, and/or other input/output connections.

Chassis 26 may include an associated exhaust panel 32. As shown in FIGS. 2A and 2B, exhaust panel 32 may include perforated sheet metal. The use of perforated sheet metal may provide increased air flow through chassis 26 in contrast to solid sheet metal. Other examples may include mesh, wire grids, and/or other material configured to allow air flow through the top of chassis 26.

As shown in FIGS. 2A and 2B, shelf unit 16b may be deployed and/or installed as a rear-access shelf unit. Some customers and or users may prefer and/or require front-access shelf units instead of rear-access shelf units. Shelf units 16 incorporating the teachings of the present disclosure and including the kit 40 described in relation to FIGS. 3A and 3B may provide a single unit for both applications taking advantage of reduced part count among other potential benefits.

Figure 3A:
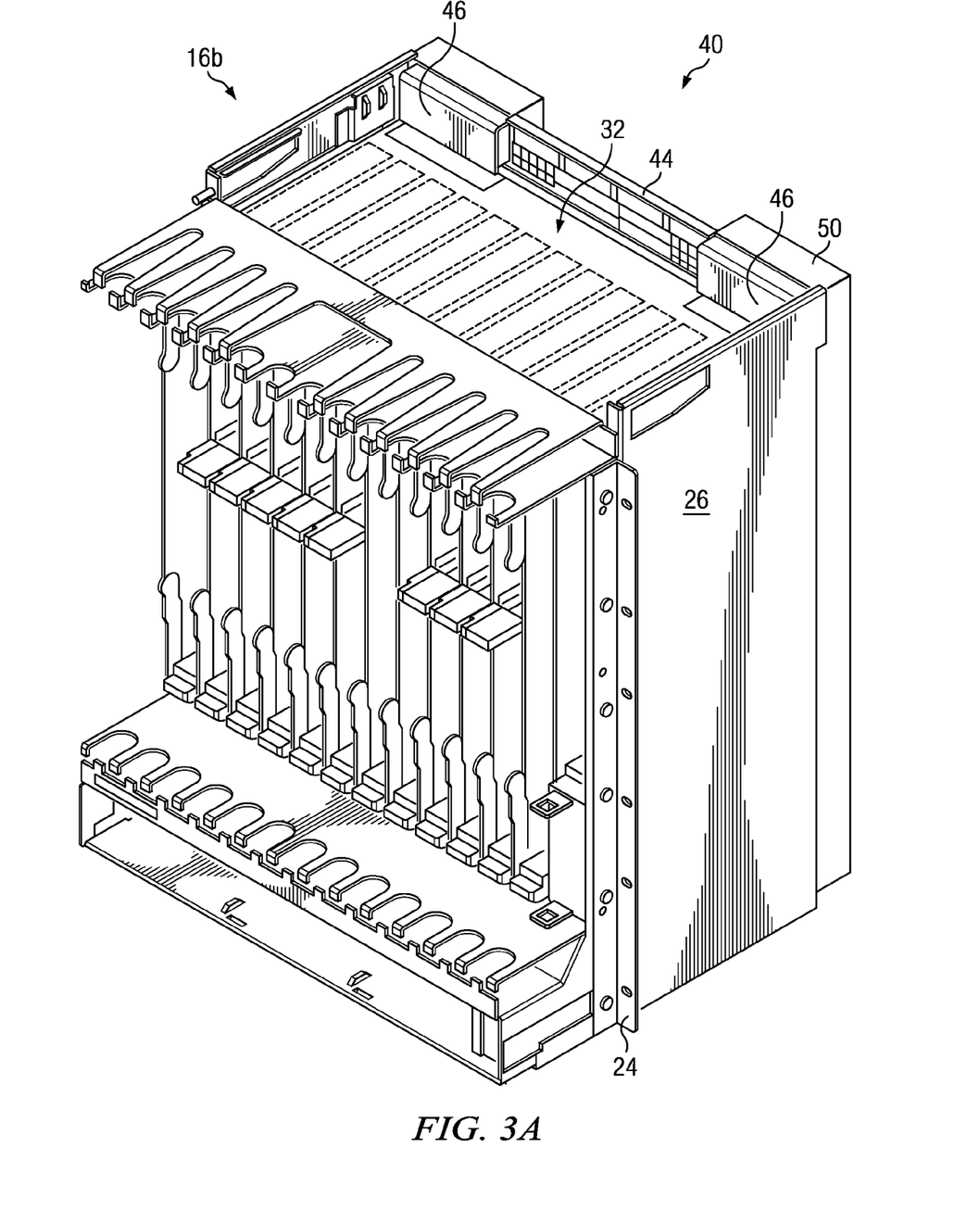
FIGS. 3A and 3B illustrates the example shelf unit of FIGS. 2A and 2B in addition to components of an example kit for providing front-access cable terminations for the rear-access shelf unit, incorporating teachings of the present disclosure.
Figure 3B:
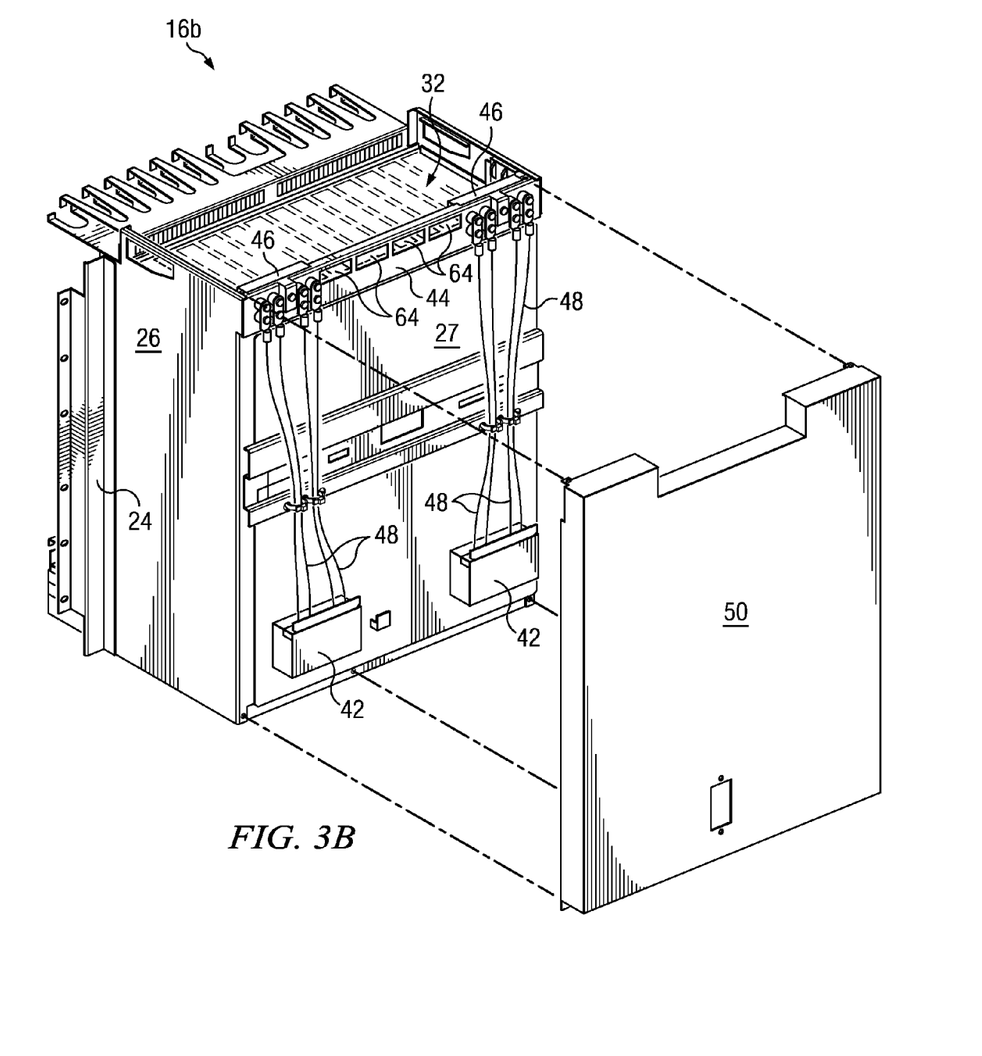

FIGS. 3A and 3B illustrate shelf unit 16b including components of an example kit 40 for providing front-access cable terminations for a rear-access shelf unit, incorporating teachings of the present disclosure. Kit 40 may include a terminal block panel 44, a terminal block 46, a set of extension cables 48, and a rear panel 50. Kit 40 may be installed on shelf unit 16b discussed in more detail in relation to FIGS. 2A and 2B. Other embodiments of kit 40 may include more or fewer parts depending on the configuration and layout of shelf unit 16. Kit 40 may be provided as an aftermarket addition to a shelf unit and/or installed for original sale to a customer and/or user.

Terminal block panel 44 may be any panel and/or bracket configured to mount to chassis 26. In the embodiment shown, terminal block panel 44 may be mounted at the rear and top of chassis 26. That position may allow a user to access terminal block panel 44 from the front of shelf unit 16b and provide a straight run for set of extension cables 48 along the back of chassis 26 and/or backplane 27. Terminal block panel 44 may include a perforated panel, a bracket, and/or any other configuration allowing airflow through at least some part of terminal block panel 44. As shown in FIGS. 2A and 2B, terminal block panel 44 may include perforations 64.

Terminal block panel 44 may be configured to attach a second terminal block 46 to chassis 26. Second terminal block 46 may include a set of terminals matching and/or corresponding to the set of terminals included in the first terminal block 42. Set of extension cables 48 may be installed to connect similar and/or corresponding terminals between the first terminal block 42 and the second terminal block 46. In such embodiments, a user may access second terminal block 46 from the front of shelf unit 16b without any need to access the rear of shelf unit 16b. The combination of terminal block panel 44, second terminal block 46, and set of extension cables 48 may provide a front-access configuration for a nominally rear-access shelf unit 16b.

Rear panel 50 may include any device, component, and/or feature of kit 40 configured to mount to chassis 26 and cover first terminal block 42 and set of extension cables 48. Rear panel 50 may be fabricated from similar material as chassis 26. For example, rear panel 50 may include folded sheet metal. Rear panel 50 may be mounted and/or connected to chassis 26 by any appropriate method and/or means. For example, rear panel 50 may be mounted to chassis 26 by screws, brackets, snap-fit, etc.

Figure 4:
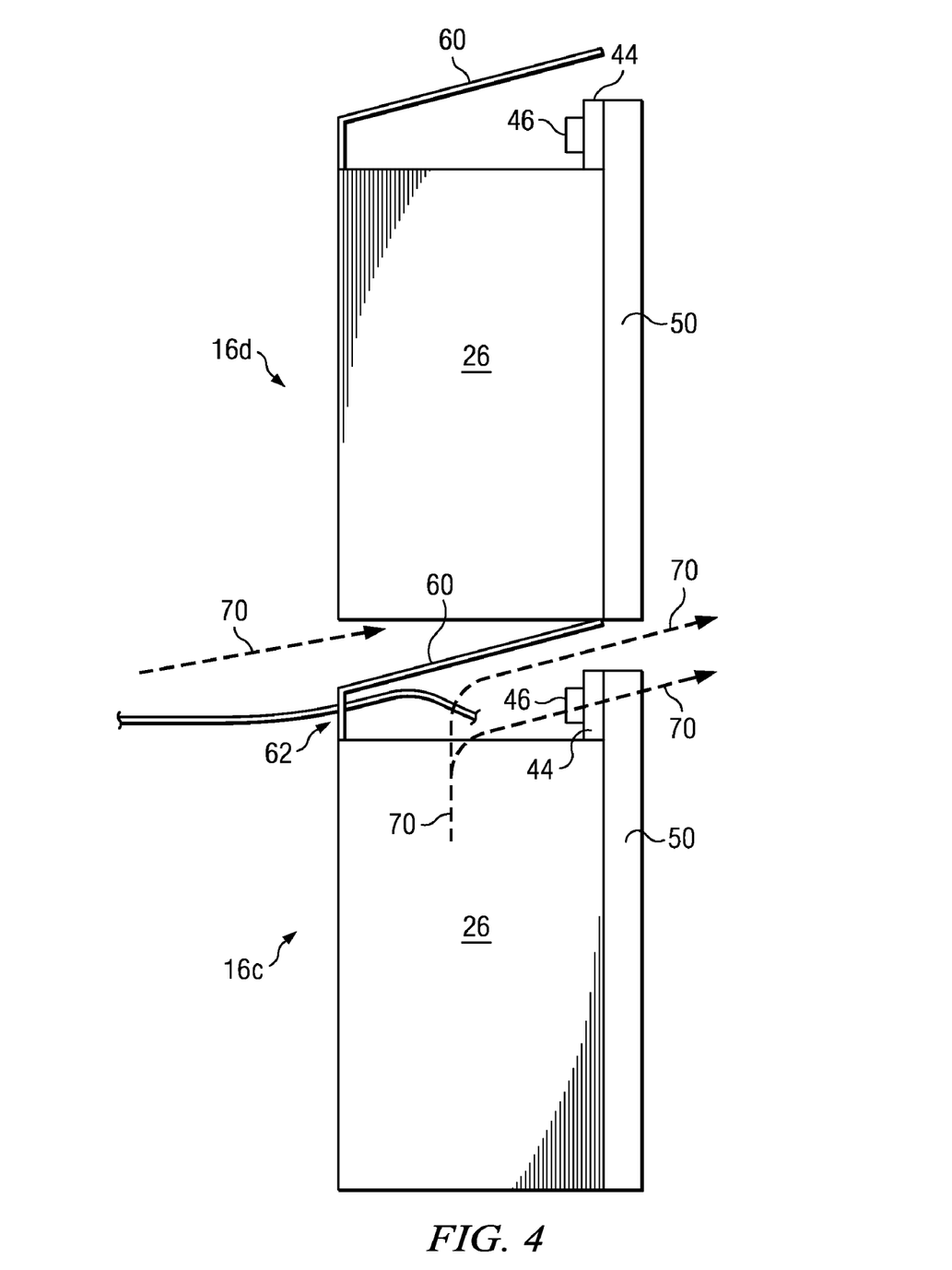
FIG. 4 shows an example implementation of a rack system including multiple shelf units incorporating teachings of the present disclosure.

FIG. 4 shows an example implementation of rack system 1 including multiple shelf units 16c and 16d incorporating teachings of the present disclosure. When shelf units 16 are mounted vertically above one another, the heat generated by the electrical components in the bottom shelf unit 16c may be transferred to the upper shelf unit 16d by convection and/or radiation. In general, the flow of air through the chassis 26 of bottom shelf unit 16c may be the dominant mode of heat rejection from shelf unit 16c and the components therein.

Kit 40 may include a baffle 60. Baffle 60 may be configured to direct air exiting chassis 26 to the rear of shelf unit 16. As shown in FIG. 4, installation of baffle 60 above bottom shelf unit 16c may channel any hot air exhausted from the chassis 26 of bottom shelf unit 16c to the rear of rack system 1 without entering the chassis 26 of top shelf unit 16d. Baffle 60 may effectively thermally isolate shelf units 16 from one another for design and/or thermal management purposes.

Some embodiments may include baffle 60 extending from the top and front of shelf unit 16 and configured to minimize air flow from shelf unit 16 to any other equipment mounted above shelf unit 16. Such embodiments of baffle 60, however, may reduce and/or eliminate access to second terminal block 46 for users and/or wiring. As shown in FIG. 4, baffle 60 may include holes 62 to allow wires and/or other conductors to pass through baffle 60. In addition, baffle 60 may be separately attached to rack system 1 and/or upright posts 20 so that baffle 60 may be removed while shelf unit 16 remains installed. Removable embodiments of baffle 60 may allow users to access second terminal block 46 without compromising the effect on air flow and/or thermal isolation provided by baffle 60. When used in combination with fan trays 55 described in relation to FIGS. 5A-5C, baffle 60 may generate air flow 70 shown by the broken arrows in FIG. 4.

Figure 5A:
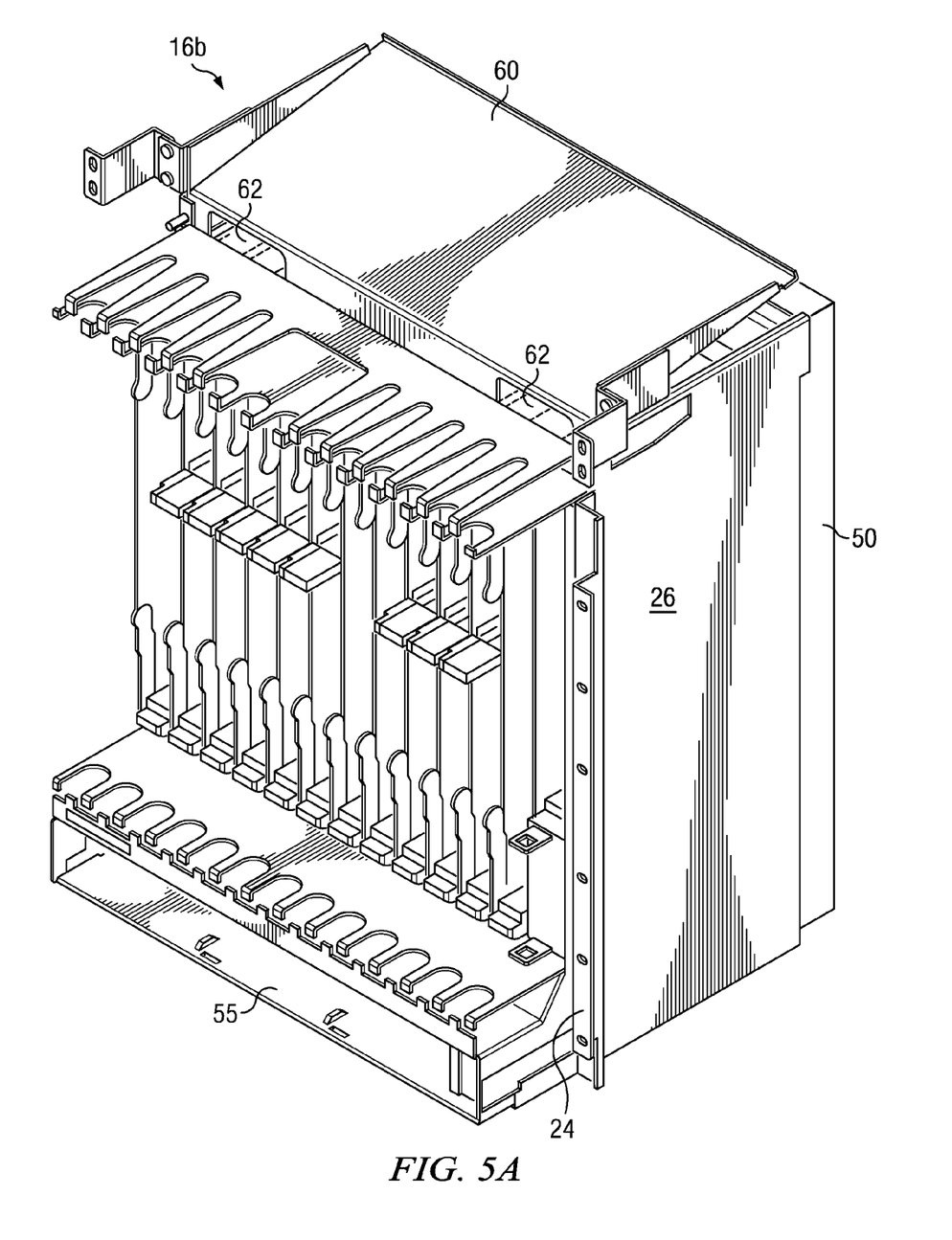
FIGS. 5A-5C illustrate additional views of the example shelf unit and kit from FIGS. 3A and 3B.
Figure 5B:
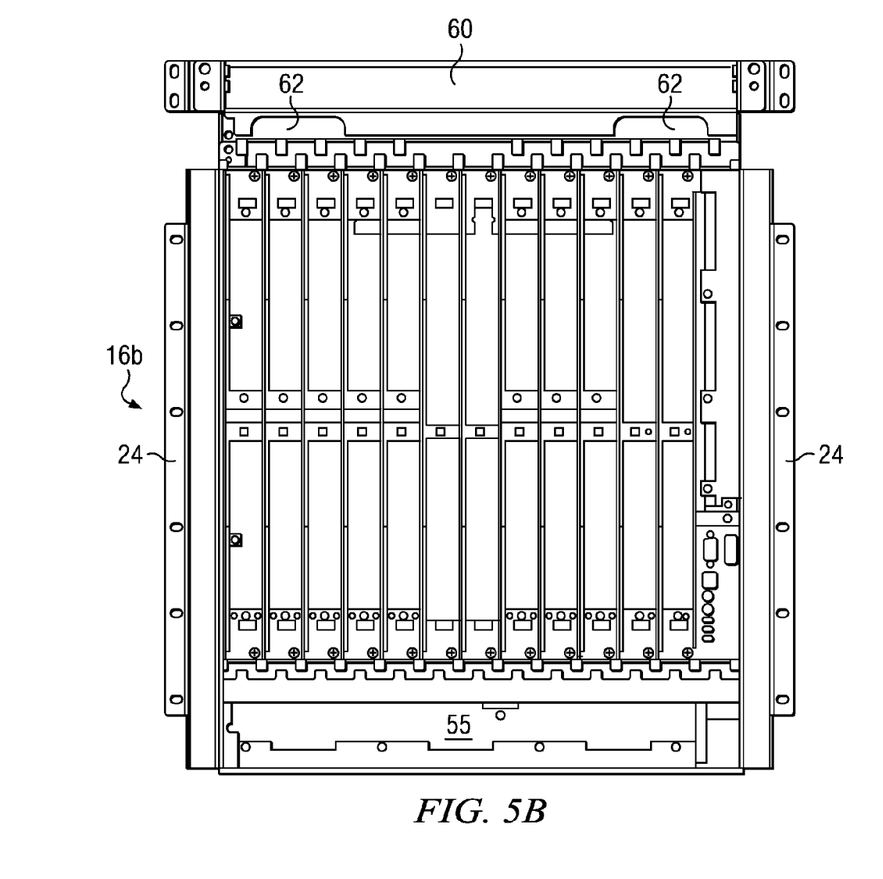
Figure 5C:
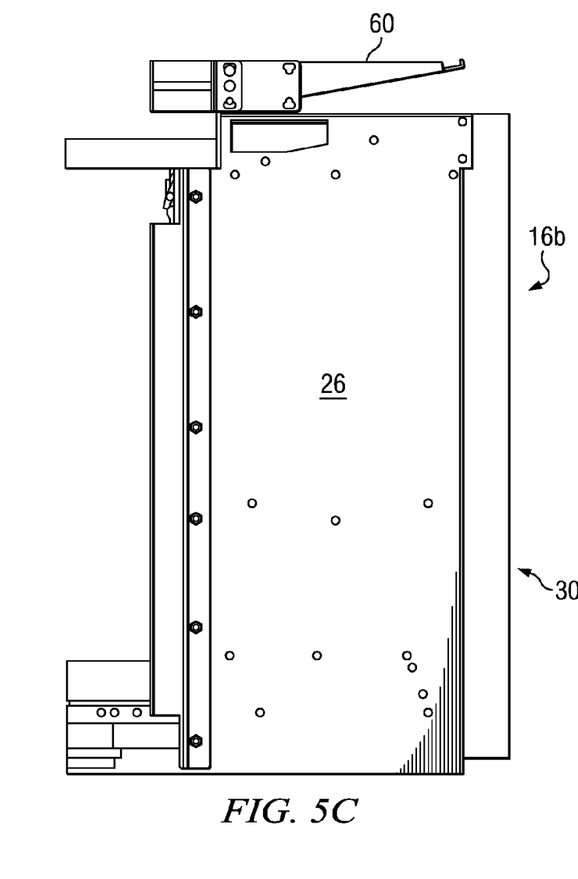

FIGS. 5A-5C illustrate additional views of the example shelf unit and kit from FIGS. 3A and 3B. Shelf unit 16b may include one or more fan trays 55.

Fan trays 55 may be configured to draw air from the front of shelf unit 16b through the body of chassis 26. When used in combination with exhaust panel 32, perforated terminal block panel 44, and baffle 60, fan trays 55 may provide equivalent air flow through chassis 26 to the air flow through a similar rear-access shelf unit (e.g., 16b) without kit 40.

Although the present invention has been described with several embodiments, various changes and modifications may be suggested to one skilled in the art. It is intended that the present invention encompass such changes and modifications as fall within the scope of the appended claims.

What is claimed is:

1. A kit for providing front-access cable terminations for rear-access shelf unit mounted in a rack system, the kit comprising:
   a terminal block panel configured to mount to the shelf unit,
   a terminal block mounted to the terminal block panel to provide front-access terminations;
   a set of extension cables providing electrical connection between the terminal block and one or more terminals disposed on a back plane associated with the shelf unit;
   a rear panel configured to attach to the shelf unit and to cover the set of extension cables; and
   a baffle configured for installation in the rack system above the shelf unit, the baffle removable for access to the front-access terminations;
   the baffle configured to direct air flow rising from the rear-access equipment to the rear of the rack.

2. A kit according to claim 1, wherein the terminal block panel is perforated to allow air flow through the terminal block panel.

3. A kit according to claim 1, further comprising the baffle extending from the top and front of the shelf unit and configured to minimize air flow from the shelf unit to any other equipment mounted above the shelf unit.

4. A kit according to claim 1, wherein the baffle includes one or more holes for user cables to extend from the terminal block to the front of the rack system.

5. A kit according to claim 1, wherein the terminal block panel is configured to mount at the top of the shelf unit adjacent the rear of the shelf unit.

6. A shelf unit for use in a rack system, the shelf unit comprising:
   a chassis configured for mounting in the rack system;
   a backplane including a plurality of connectors for various plug-in units;
   a first terminal block disposed at the rear of the chassis, the first terminal block in electronic communication with the plurality of connectors;
   a second terminal block disposed at the top of the chassis, the second terminal block providing front-access terminations at the top of the chassis;
   a set of extension cables providing electrical connection between the first terminal block and the second terminal block;
   a rear panel attached to the rear of the chassis and covering the set of extension cables;
   a fan tray disposed adjacent the bottom of the chassis, the fan tray configured to draw air from the bottom of the chassis upward across the various plug-in units; and
   a baffle disposed adjacent the top of the chassis, the baffle disposed to direct air exiting the top of the chassis to the rear of the chassis.

7. A shelf unit according to claim 6, further comprising the baffle extending from the top and front of the chassis and configured to minimize air flow from the chassis to any other equipment mounted in the rack system above the shelf unit.

8. A shelf unit according to claim 6, wherein the baffle includes one or more holes for user cables to extend from the second terminal block to the front of the rack system.

9. A shelf unit according to claim 6, further comprising the shelf unit compatible with a 19" rack system.

10. A shelf unit according to claim 6, further comprising the shelf unit compatible with a 23" rack system.

11. A shelf unit according to claim 6, further comprising the shelf unit compatible with a ETSI rack system.

12. A shelf unit according to claim 6, further comprising three fan trays.

13. A shelf unit according to claim 6, further comprising four fan trays.

14. A shelf unit according to claim 6, wherein the fan tray is attached to a plug-in unit housed in the chassis.

15. A shelf unit according to claim 6, further comprising the second terminal block connected to a terminal block panel disposed at the top of the chassis.

16. A shelf unit according to claim 6, further comprising the second terminal block connected to a terminal block panel disposed at the top of the chassis, wherein the terminal block panel is perforated to allow air flow therethrough.

17. A method for converting a rear-access shelf unit for use with a rack system into a front-access shelf unit, the method comprising:

mounting a terminal block panel at the top of the shelf unit, the terminal block panel disposed adjacent the rear of the shelf unit;
mounting a terminal block on the terminal block panel;
connecting a first end of an extension cable to a rear-access terminal block disposed on the rear of the shelf unit;
connecting a second end of the extension cable to the terminal block mounted on the terminal block panel; and
covering the extension cable with a rear panel.

18. A method according to claim 17, further comprising attaching a baffle to the rack system above the shelf unit, the baffle configured to direct air rising from the shelf unit to the rear of the rack.

19. A method according to claim 17, further comprising attaching wiring to the terminal block from the front of the rack.

20. A method according to claim 17, wherein the terminal block panel is perforated to allow air flow through the terminal block panel.

21. A method according to claim 17, further comprising attaching a baffle to the rack system above the shelf unit, the baffle configured to direct air rising from the shelf unit to the rear of the rack, wherein the baffle extends from the top and front of the shelf unit and is configured to reduce air flow from the shelf unit to any other equipment mounted in the rack system above the shelf unit.

* * * * *